March 28, 1967 V. I. MOROZOV ET AL 3,310,835
DISC EXTRUDER
Filed July 16, 1964 4 Sheets-Sheet 1

United States Patent Office 3,310,835
Patented Mar. 28, 1967

3,310,835
DISC EXTRUDER
Vladimir Ivanovich Morozov, Gorjkovskaja region, Majakovskogo ulitsa 26, Apt. 35, Dzerzhinsk, U.S.S.R.; Evgeny Evlampievich Rylov, Novye Cheremushki, kvartal 10, korpus 6, Apt. 28, Moscow, U.S.S.R.; Boris Petrovich Shtarkman, Gorjkovskaja region, Lenin pr, I, Apt. 53, Dzerzhinsk, U.S.S.R.; Alexandr Ivanovich Grachev, Gorjkovskaja region, 40 let Oktjabrja pr, 16–a, Apt. II, Dzerzhinsk, U.S.S.R.; and Victor Mikhailovich Khanov, Gorjkovskaja region, Suvorova ulitsa 32, Apt. 17, Dzerzhinsk, U.S.S.R.
Filed July 16, 1964, Ser. No. 383,066
11 Claims. (Cl. 18—12)

This invention relates to extruders for processing polymer materials.

In disc extruders of conventional design, the main working tool is a disc which is a solid of revolution. Such a design entails many disadvantages such as: poor plasticizing and homogenizing capacities; impossibility of obtaining steady and continuous mastication of material under various conditions of the process; poor efficiency when extruding shaped pieces of small cross-sections; difficulties during degassing of material.

As a result of experiments, we have found that good operation of a disc extruder depends both on the shape of the disc and the housing and on change in the size of the passage section between them in the direction of the material flow.

In particular, we have found that to obtain uniform heat generation while the polymer material is flowing in the space between the rotating disc and stationary housing, it is necessary to compensate for reduced viscosity of fusion. To achieve this, the shape and mutual arrangement of the rotating disc and the stationary housing are arranged such that the passage section for material decreases gradually in the direction of its flow. This construction feature ensures complete mastication and homogenizing of material and contributes to better release of volatile gases from fusion. As a result of experiments, we have also found that to provide for a steady operation of an extruder, the material should be continuously and uniformly heated. This is achieved by inducing a vortex motion of the mass in the intake zone of the disc extruder due to the arrangement whereby the rotating disc is made in the form of a polyhedron, as defined by flat or curved faces. Another precondition for formation of a violent vortex at a constant speed of rotation is a tangentially-located charging neck.

As a result of experiments, we have also found that when an additional influence on the material is necessary, for example, to increase its pressure or change the direction of its flow, provision of additional means should be made right at the point where the polymer material is discharged. These additional means can be in the form of a screw, a gear pump, or a rotating disc. Such additional means can be equipped with an individual drive.

As a result of experiments, we have further found that when the disc is rotated oscillatably around its axis, instead of being rotated in one direction, a pronounced increase of working pressure can be obtained.

The invention is generally intended for processing polymeric materials to produce sheets, films, fibers, granules, and the like, and is aimed at obtaining better plasticizing and homogenizing of the polymeric material.

Another object of the invention is to achieve steady operation of the extruder under variable conditions of processing.

Another object of the invention is also to increase the pressure and to improve the efficiency of the extruder.

To obtain the above and other objects, the invention comprises a new construction and a combination of units and parts which is hereafter described with reference to the drawing. It will be evident that changes in the exact embodiments of the invention presented herein can be made within the scope of the invention.

Other objects and advantages of the invention will be evident from the following detailed description in conjunction with the accompanying drawings, in which.

The same numerals will be used for the same parts throughout the drawing.

Figure 1:
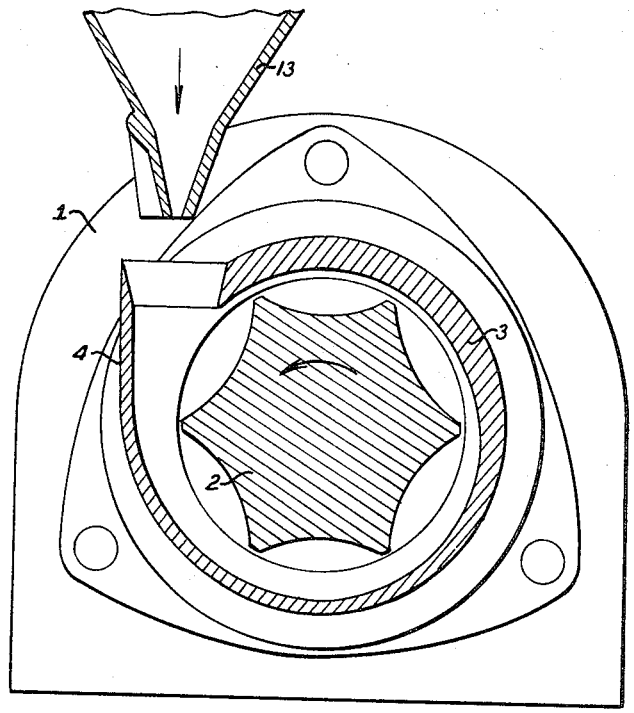
FIG. 1 is a cross-section through the disc extruder along line 1—1 in FIG. 2.

The disc extruder comprises a stand 1, a rotating disc 2, and a housing 3 with a neck 4 tangentially arranged with respect to the rotating disc. The material to be extruded is fed from hopper 13 into the housing at the neck 4 as seen in FIG. 1.

Figure 3:
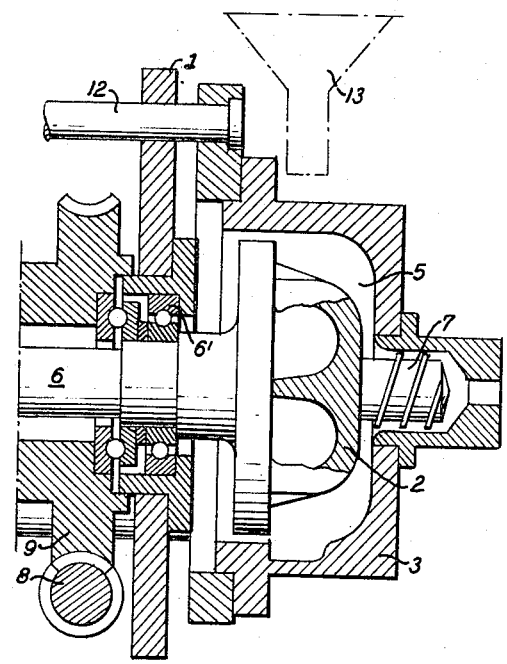
FIGS. 3–6 are longitudinal sections through the disc extruder showing modified forms thereof.

The rotating disc 2 and the stationary housing are shaped so as to form a passage of space 5 between them which becomes narrower in the direction of the flow of material. The rotating disc 2 is secured to a shaft 6 which is supported in bearings 6' in the stand 1 and is coupled to a motor M for being driven in rotation thereby. The disc 2 can be fitted with a conveyor screw 7 (FIG. 3) in its central portion which serves to increase the extruder's efficiency by promoting the discharge of the polymer material from the extruder.

Figure 2:
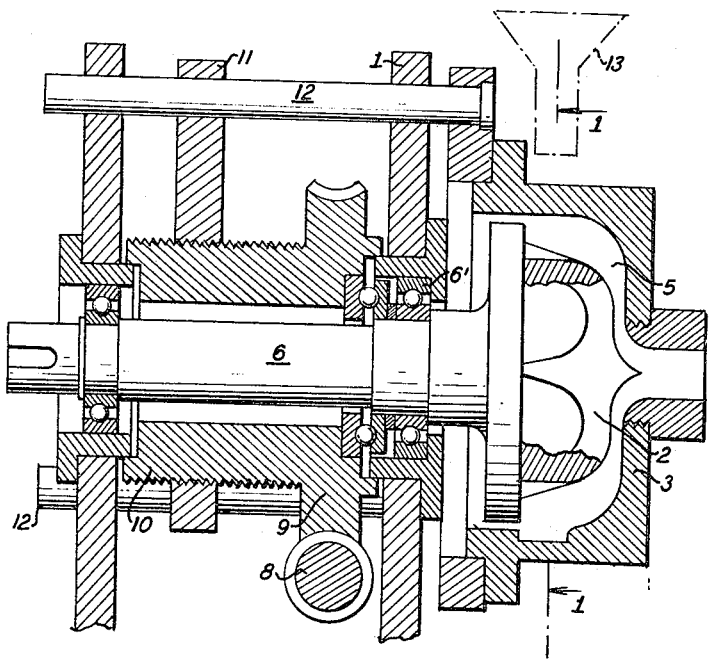
FIG. 2 is a longitudinal section through the disc extruder.

The housing 3 is provided with a device as seen in FIG. 2 for adjusting the distance between the end surfaces of the disc 2 and the housing 3. The device comprises a worm 8, a worm wheel 9 provided with threading 10, a crosspiece 11 threadably mounted on the wheel 9 and rods 12 secured to the housing 3 and the crosspiece 11 and slidable in stand 1.

The rotation of the worm 8 is transmitted to the worm wheel 9 which causes axial movement of the crosspiece 11 and the housing 3 secured thereto. Thus, the size of the space 5 can be smoothly controlled even during an extruding operation.

As seen in FIGS. 1 and 2 the rotating disc 2 is formed as a polyhedron with its sides formed by alternate flat portions and curved notched portions, which is in operation provide for a variable gap between the side surfaces of the disc and the housing, to induce vortex motions in the material, as shown in FIG. 1.

The faces of the disc 2 can be bevelled and in some instances cover only part of the disc side surface.

Figure 4:
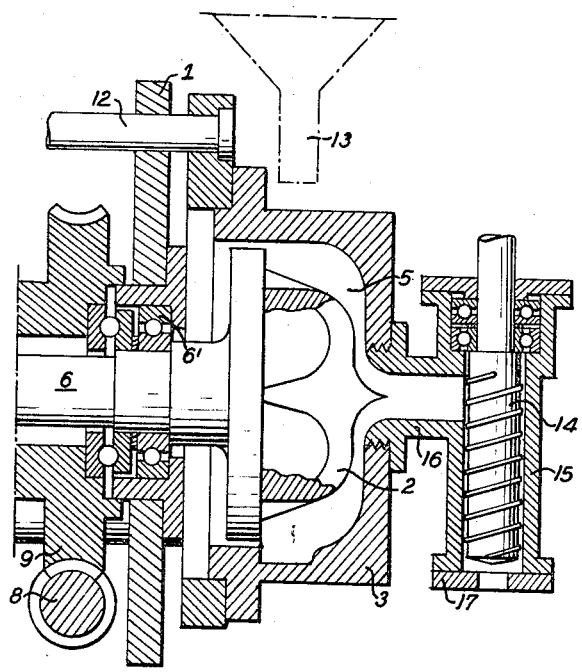

An auxiliary screw 14 (FIG. 4) is arranged at an angle with respect to the axis of the disc inside a cylinder 15, which is coupled to the housing 3 by means of an adapter connection pipe 16. The material is forced out by auxiliary screw 14 through a molding endpiece 17.

Figure 5:
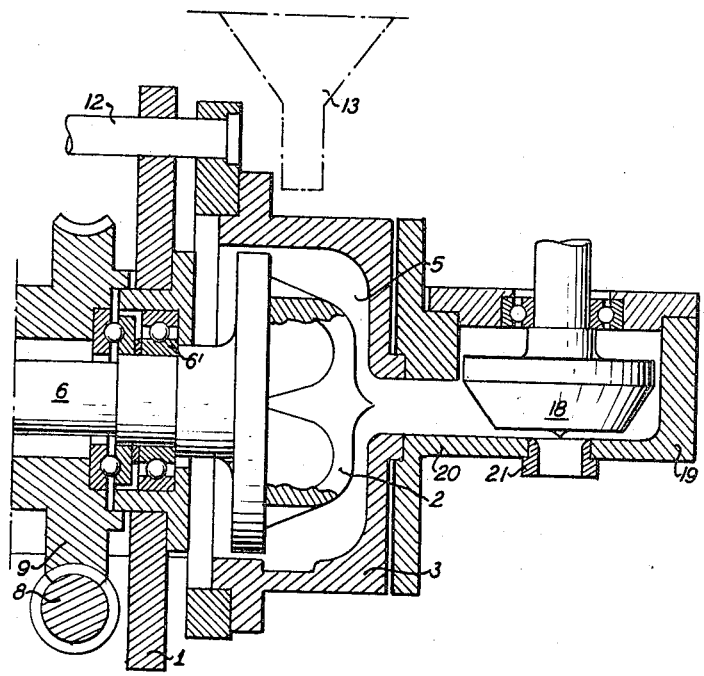

An auxiliary disc 18 (FIG. 5) is arranged at an angle with respect to the axis of the disc 2 in a separate housing 19, which communicates with the housing 3 of the first disc 2 via a channel 20. The material is forced out through the molding endpiece 21.

Figure 6:
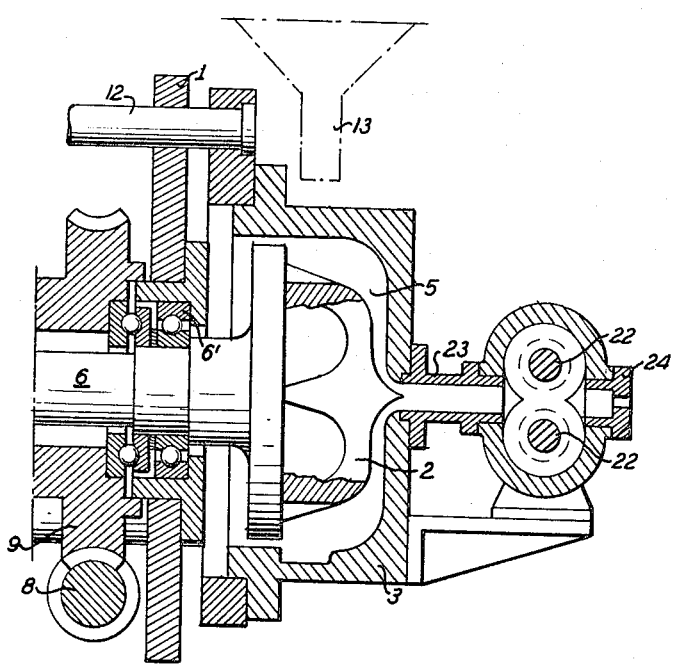

An additional gear pump 22 (FIG. 6) is connected to the housing 3 through a branch pipe 23. Material is forced out by the gear pump through a molding die 24.

Figure 7:
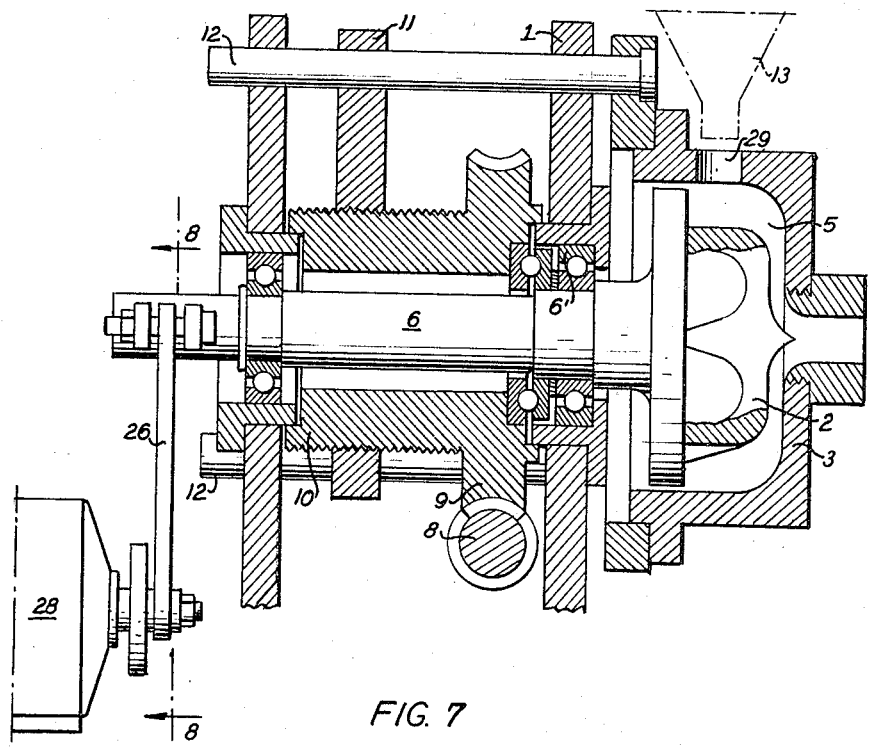
FIG. 7 is a longitudinal section through the disc extruder showing means for oscillating the disc in rotation.
Figure 8:
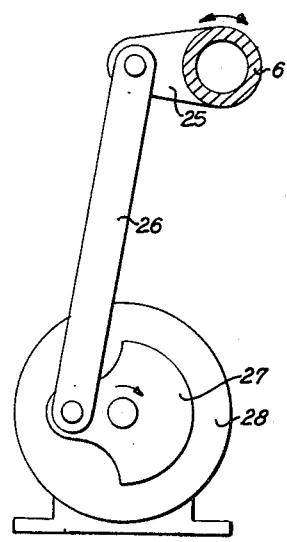
FIG. 8 is a cross-sectional view taken along line 8—8 in FIG. 7.

Rotational oscillations can be imposed on disc 2 by means of a reciprocation mechanism such as a crankgear (FIG. 8) in which its oscillations are transmitted through a crank 25 and a connecting rod 26 linked to a cam 27 inserted on the shaft of an electric motor 28. Reciprocation can be also obtained through an electromagnetic, hydraulic or pneumatic drive. With an oscillating disc, the material is fed into the extruder from the hopper 13 through the neck 29 (FIG. 7).

What we claim is:

1. A disc extruder comprising a housing, means mounted on said housing for receiving material to be extruded, a rotatable disc arranged within said housing and defining a spacing between the housing and said disc for the extruding and advancement of the material, said spacing gradually decreasing in the direction of movement of the extruded material, said disc having a side surface formed by alternate curved and flat regions which define a radially varying clearance between said housing and said disc during rotation of said disc to induce the extruded material to perform vortex motions between the disc and housing; means associated with said housing and disc for adjusting the spacing therebetween, and means for driving the disc in rotation.

2. An extruder as claimed in claim 1 wherein said means for receiving material to be extruded comprises an inlet neck communicating with said spacing.

3. An extruder as claimed in claim 1 comprising means coupled to said housing and in communication with said spacing for receiving the extruded material therefrom and performing an additional operation thereon.

4. A disc extruder as claimed in claim 2, wherein the inlet neck is arranged tangentially to the disc.

5. A disc extruder according to claim 3, wherein the means for performing an additional operation on the extruded material comprises a screw, mounted coaxially with said disc for raising the pressure of the extruded material.

6. A disc extruder according to claim 3, wherein the means for performing an additional operation on the extruded material comprises a screw having its axis disposed at an angle with respect to the axis of said disc for changing the direction in which the material is extruded and increasing the pressure.

7. A disc extruder as claimed in claim 3, wherein the means for performing an additional operation on the extruded material is an auxiliary rotatable disc arranged at an angle with respect to said first disc for changing the direction of material extrusion and also for increasing the outlet pressure of the material leaving the extruder.

8. A disc extruder as claimed in claim 3, wherein the means for performing an additional operation on the extruded material comprises gear pump means for increasing the outlet pressure on the material leaving the extruder and for changing the direction of the material extrusion.

9. An extruder as claimed in claim 1 wherein the means for driving the disc in rotation includes means for alternating the direction of the rotation of the disc.

10. A disc extruder as claimed in claim 1 wherein said means for driving the disc in rotation comprises a motor, and a crank mechanism coupled to the motor for converting unidirectional rotary movement of the motor to rotation of said disc about its axis in alternate opposite directions.

11. An extruder as claimed in claim 1 wherein said disc is substantially of cylindrical configuration and is provided with notches angularly arranged therein which extend partially along the length thereof.

References Cited by the Examiner

UNITED STATES PATENTS 3,032,814 5/1962 Miner _____ 18—12
3,153,686 10/1964 Adams _____ 18—12 X

FOREIGN PATENTS 1,262,650 4/1961 France.

WILLIAM J. STEPHENSON, *Primary Examiner.*